UNITED STATES PATENT OFFICE.

CARL IMMERHEISER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

COLORING-MATTER LAKE AND PRODUCING SAME.

1,232,551.      Specification of Letters Patent.      Patented July 10, 1917.

No Drawing.      Application filed August 3, 1914. Serial No. 854,731.

*To all whom it may concern:*

Be it known that I, CARL IMMERHEISER, citizen of the German Empire, residing at Ludwigshafen-on-the-Rhine, Germany, have invented new and useful Improvements in Coloring-Matter Lakes and Producing Same, of which the following is a specification.

I have discovered that coloring matter lakes which possess a great brilliancy, are extremely fast to water and very fast against the action of light, can be obtained by precipitating basic coal tar coloring matters by means of a phosphomolybdic acid, and for the purposes of this invention I regard salts of the said phosphomolybdic acids as equivalent to the acids themselves.

The following example will serve to illustrate further the nature of this invention, which, however, is not confined to this example. The parts are by weight.

Example.

Mix together 10 parts of heavy spar, a solution of 5 parts of aluminium sulfate (containing 18% $Al_2O_3$) in 50 parts of water, a solution of 2½ parts of calcined soda in 25 parts of water and a solution of 6 parts of barium chlorid in 60 parts of water. Then add a solution of one part of diamond green G (salt of tetramethyl-diamino-triphenyl-carbinol) in 200 parts of water and a solution of from 2 to 3 parts of sodium phosphomolybdate in from 20 to 30 parts of water. Then filter off the coloring matter lake and work it up in the usual manner.

Now what I claim is:—

1. A coloring matter lake containing the combination of the color-base of a basic coal tar coloring matter and a phosphomolybdic acid.

2. A coloring matter lake containing the combination of tetramethyl-diamino-triphenyl-carbinol and a phosphomolybdic acid.

3. The process of producing coloring matter lakes by precipitating a basic coal tar coloring matter by means of a phosphomolybdic acid.

4. The process of producing coloring matter lakes by precipitating a salt of tetramethyl-diamino-triphenyl-carbinol with sodium phosphomolybdate.

In testimony whereof I have hereunto set my hand in the presence of two subscribing witnesses.

CARL IMMERHEISER.

Witnesses:
    T. ALEC LLOYD,
    ANDREW HEEV.